April 16, 1940. A. P. BROCKBANK 2,197,294
AUTOMATIC CONTROL OF WASHING AND OTHER MACHINES
Filed June 27, 1938 2 Sheets-Sheet 2
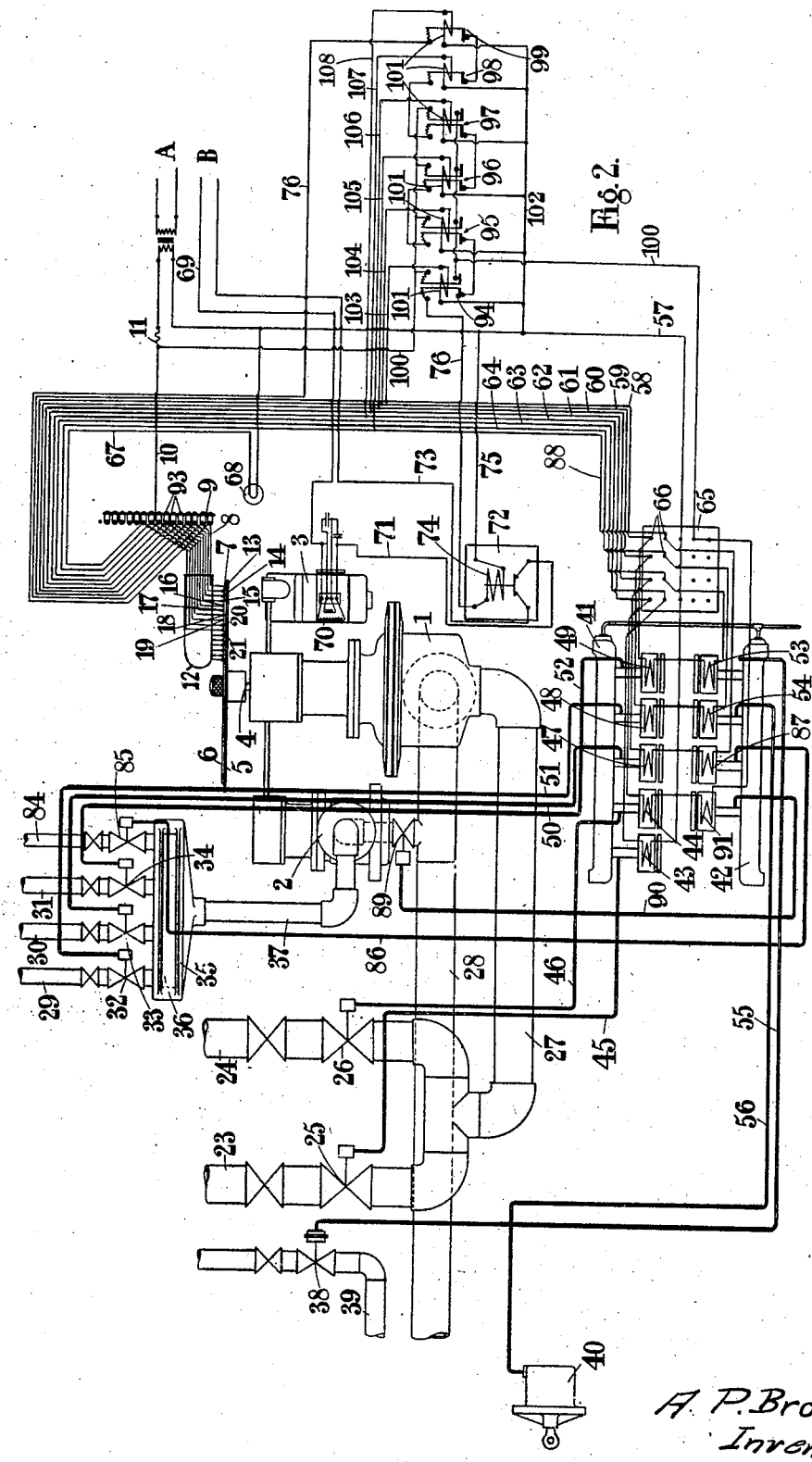
A. P. Brockbank
Inventor
By Glascock Downing & Seebold
Attys.

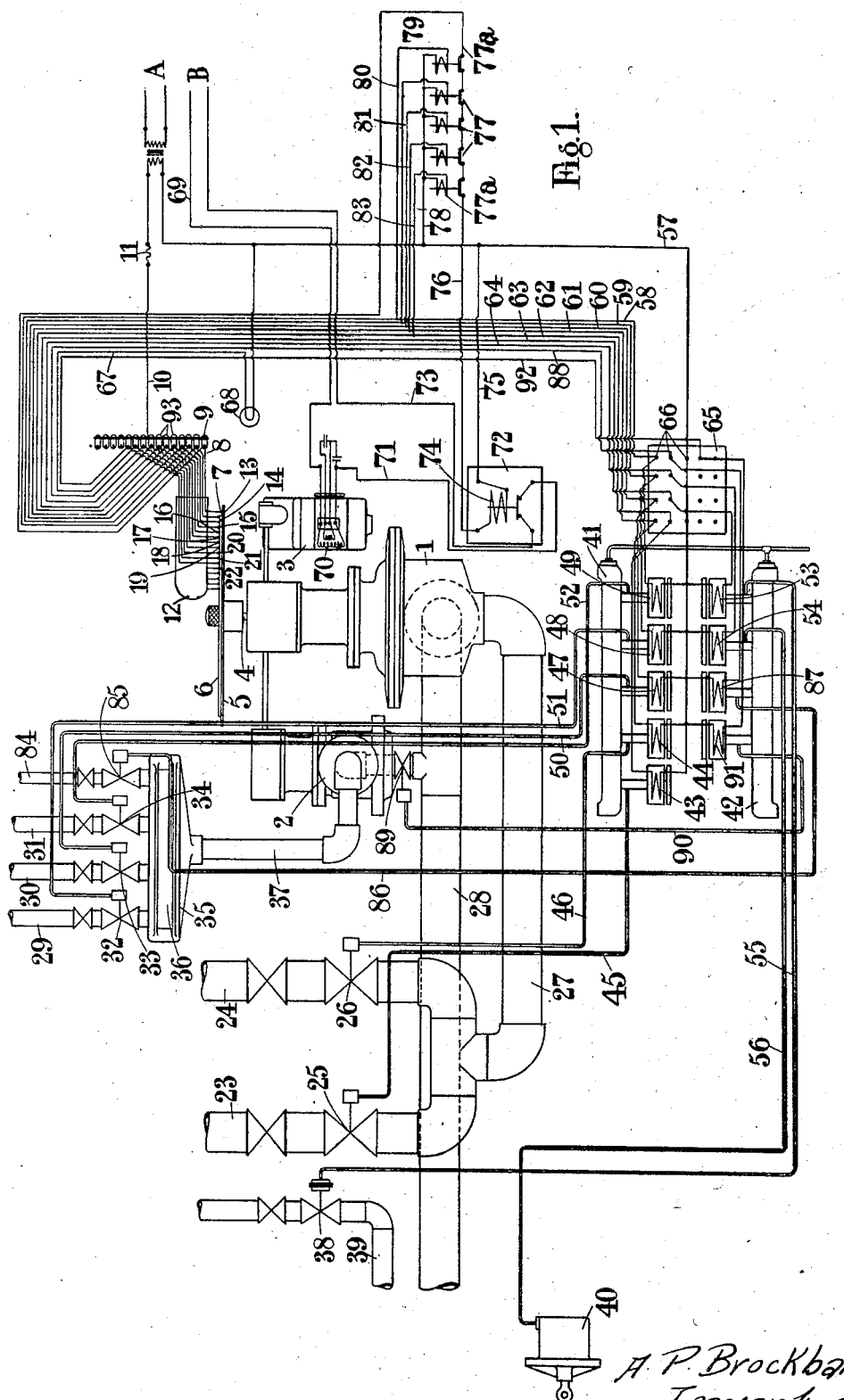

Patented Apr. 16, 1940

2,197,294

UNITED STATES PATENT OFFICE 2,197,294

AUTOMATIC CONTROL OF WASHING AND OTHER MACHINES

Allan Pelle Brockbank, Peterborough, England, assignor to Baker Perkins Limited, Peterborough, England Application June 27, 1938, Serial No. 216,156
In Great Britain July 22, 1937

9 Claims. (Cl. 221—101)

This invention relates to automatic controls and automatic mechanism for washing or other machines or plant in reference to which it is necessary to deliver predetermined quantities of liquid at predetermined times, and has more particular reference to plants of the character wherein valve controlled pipe lines supply various liquids, other than water, to a common pipe leading to a measuring device or chamber such for example as described in prior U. S. Serial No. 121,914 filed January 22, 1937, in the name of David Yeo Bartholomew Tanqueray.

According to U. S. Serial No. 121,914, the various solutions such as soap, soda, bleach and blue are delivered through valve controlled pipe lines to a common pipe or manifold leading through a flow meter or pump to the washing drum or the like, the opening of the valves at predetermined times being under the control of a rotary control device which is driven at a predetermined time rate except when a liquid delivery operation has been initiated whereupon the meter through which the liquid is delivered takes over the drive of the control device to drive it at a rate corresponding with the rate of delivery of liquid and such meter drive is terminated when the predetermined quantity of liquid has been delivered.

It will be appreciated that upon termination of delivery of a solution according to the above patent specification or in any case where a common pipe has to supply different liquids to a meter or measuring chamber that a quantity of solution remains in the meter and manifold or common pipe and this residual solution will be delivered upon initiation of the next solution delivery operation. It will thus be appreciated that although the actual quantity of solution delivered is the predetermined quantity, such solution contains the residual solution from the previous delivery which may be a different kind. Hence, it can be said that the measurement of any one kind of solution is not altogether accurate since the actual amount of any one solution delivered at a time is the predetermined quantity less the amount of residual solution left from the previous delivery. It will also be seen that the carrying over of the residual solution to the next delivery operation may be detrimental to the washing process. For example, in a washing process it is usual to deliver blue to the washing drum in the final rinsing step and the delivery of residual soap or soda with the blue obviously would be undesirable for the rinsing operation. Furthermore the leaving of certain solutions in a meter overnight or for lengthy periods may have a detrimental effect on the meter.

The objects of the invention are to obtain a more accurate measurement of the quantities of solution; to ensure that all the measured quantity of solution is delivered through the meter and reaches the washing drum or the like at the proper time, i. e., so that it is not carried over to the next operation or process: and to minimise corrosion in the meters.

The invention consists in delivering through the common pipe or manifold and the measuring device or meter a quantity of flushing water after each solution delivery operation.

The delivery of the flushing water may take place through a valved pipe leading to the common pipe or manifold the valve being under the control of a timing or rotary control device such as that described in the patent specification numbered as above.

There may be a tendency for liquid remaining in the meter and manifold after a delivery operation, to escape from the meter (without operating it) due to ingress of air from the delivery side of the meter. This occurrence may affect accurate measurement and is prevented by providing a valve immediately adjacent the outlet from the meter together with means adapted to open the valve only when liquid is being delivered through the common pipe or manifold. This valve may be opened and closed at the required times under the direct control of the rotary control device or means may be provided whereby this valve is operated whenever a solution delivery valve or the flushing water valve is operated.

Convenient embodiments of the invention are illustrated in the accompanying drawings, in which:—

Figure 1 is a diagrammatic view of an automatic control for a washing machine; and Figure 2 is a view similar to Figure 1 but illustrating a modified manner of controlling the valve in the delivery pipe from the solution meter.

In carrying the invention into effect according to one convenient mode illustrated in Figure 1 as applied by way of example to an automatic control for washing machines and to the arrangement described in the specification of U. S. Serial No. 121,914, a meter 1 through which hot and cold water is adapted to be delivered and a smaller meter 2 through which the various solutions are adapted to be delivered, together with driving means between these meters, a motor and a timing or rotary control device, may be arranged as described in the prior specification referred to as may also be the operating means between the rotary control device and the various valves controlled thereby. Thus, an electric motor 3 is adapted to drive at a predetermined time rate, through reduction gearing including a free wheel clutch, a spindle 4 carrying a contact plate or disc 5 forming the main element of the timing or rotary control device. This spindle 4 is adapted also to be driven by either of the two meters through reduction gearing including a free wheel clutch. The contact plate 5 is adapted to receive a perforated or slotted record card 6 of known form, the slots or perforations of which are of predetermined position and circumferential length according to the nature and cycle of operations to be performed, and is wired to constitute a common terminal of electric circuits involved in the controlling operations. As shown the contact plate 5 is connected by means of a finger terminal or brush 7, through wire 8, switch plate 9 and wire 10, which may include a fuse 11, to one side of a source of current supply A. Cooperating with the slotted card 6 is a radial arm 12 carrying a plurality of finger terminals or contacts 13 to 22 adapted to establish the various electric circuits with the contact plate 5 through the respective slots in the record card 6.

A supply pipe 23 for hot water and a supply pipe 24 for cold water respectively, having a motor or relay operated valve 25, 26 therein, join in a common supply pipe 27 leading to the larger flow meter 1 which is adapted to be actuated by the flow of hot or cold water delivered therethrough to a delivery pipe leading to the washing machine (not shown).

Supply pipes 29, 30, and 31 for delivering the various solutions, such as soap, soda, and blue, are respectively provided with a motor or relay operated valve 32, 33, and 34 and lead to a common pipe or manifold 35, conveniently having a glass front 36, from which the solutions are adapted to be delivered through a common pipe 37 in which the smaller meter 2 is located so that the flow of liquid from these supply pipes actuates the meter as it passes therethrough to the delivery pipe 28 leading to the washing machine.

The various supply valves referred to and also other valves for example a motor or relay operated valve 38 controlling supply of steam through pipe 39 adapted to deliver directly to the washing machine and a motor or relay operated outlet ram 40, may be controlled directly by the electric circuits established under control of the timing or rotary control device comprising the contact plate 5, the slotted record card 6 and the finger terminals 13 to 22, or they may be controlled through relay devices operated by such circuits. As illustrated the valves, which may be of known type are adapted to be opened by fluid under pressure supplied from headers or manifolds 41 and 42 under control of magnetic control valves adapted to be in turn controlled by the electric circuits established under control of the rotary control device.

Thus, there are magnetic control valves 43 and 44 respectively for controlling the delivery of fluid under pressure to the hot and cold water supply valves 25 and 26 through conduits 45 and 46, magnetic control valves 47, 48 and 49 for controlling delivery of fluid under pressure respectively to the soda, soap and blue supply valves 33, 32 and 34 through conduits 50, 51 and 52, and magnetic control valves 53 and 54 for respectively controlling the delivery of fluid under pressure to the steam supply valve 38 through conduit 55 and the outlet ram 40 through conduit 56. One side of each of the solenoids of the magnetic control valves 43, 44, 47, 48, 49, 53 and 54 is wired to one side of the source of current supply A through a common wire 57 while the other side of each of the solenoids is wired to one of the finger terminals 13 to 19. Thus the solenoid of magnetic valve 49 is connected to finger terminal 13 by wire 58, that of magnetic valve 48 is connected to finger terminal 14 by wire 59; that of magnetic valve 47 is connected to finger terminal 15 by wire 60; that of magnetic valve 44 is connected to finger terminal 16 by wire 61; that of magnetic valve 43 is connected to finger terminal 17 by wire 62, while those of magnetic valves 53 and 54 are respectively connected to finger terminals 18 and 19 by wires 63 and 64. Conveniently, a panel 65 is provided having a series of plug-in sockets 66 permanently wired to the solenoids of the magnetic valves, while the wires 58 to 64 may each be provided with a jack for selectively plugging into the sockets whereby the magnetic valve which any one finger terminal 13 to 19 is to control may be selected by plugging the jack connected to such finger terminal into the appropriate socket 65. The finger terminal 21 is connected through wire 67 to a lamp 68 whereby a circuit may be established through the lamp, for example, to give a visible indication when a particular cycle of operations has been completed, by providing an appropriate slot in the record card 6 for cooperation with the finger terminal 21.

The electric circuits adapted to control the supply valves for the liquids each include the coil of a relay switch adapted to be operated when a circuit is established to break the circuit of the electric motor 3 so that the drive of the control device by the motor is interrupted to permit one or other of the meters 1 or 2 to take over the drive and drive the control device at a rate corresponding with the rate of flow of liquid through the meter.

The motor circuit is as follows: Supply mains B, wire 69, motor winding 70, lead 71, closed contacts of motor relay switch 72, and return lead 73 to the supply means B. The motor relay switch 72 is held closed when its coil 74 is energised by the establishment of the following circuit: Supply means A, wire 57, lead 75, coil 74 of motor relay switch 72, lead 76 to wire 8, switch plate 9 and lead 10 to the other side of the supply mains A. Located in the lead 76 is a series of solenoid operated relay switches 77 which are held closed when no current is flowing through their solenoid coils 77a. One side of each of the solenoid coils is connected by a common lead 78 to the wire 57 leading to one side of the supply mains A while the other side of the coils are respectively connected by wires 79 to 83 to the wires 58 to 62 leading to the finger terminals 13 to 17 whereby a circuit is established through one of the coils 77a to open its relay switch 77 and so open the motor relay switch 72 to interrupt the motor circuit whenever any one of the finger terminals 13 to 17 controlling the opening of the liquid supply valves contacts with the disc or plate 5 through a slot in the record card 6.

A supply pipe 84 for water, preferably hot, is provided which leads to the common pipe or manifold 35 through which the various solutions are delivered, this supply pipe being provided with a motor or relay operated valve 85 adapted to be controlled by the rotary control device so as to deliver a predetermined quantity of water through the manifold 35 and meter 2 after each solution delivery operation. As shown the valve 85 is adapted to be opened by fluid under pressure supplied through conduit 86 from header 42 under control of a magnetic control valve 87. One side of the solenoid of the magnetic control valve 87 is connected to finger terminal 20 by wire 88 while the other side of the solenoid is connected to the common wire 57. The water delivered from supply pipe 84 acts to flush the meter 2 and manifold 35 and ensure that any residual solution left in the meter and manifold is passed through the meter and delivered to the washing drum or the like. Thus the predetermined quantity of solution is accurately measured and delivery of the full measured quantity to the washing drum is secured whilst corrosion in the meter is minimised.

The amount of flushing water delivered through the small meter 2 to the washing drum is comparatively small and may be negligible as compared with the amount of water used in a washing step. However, to compensate therefor the amounts of hot and/or cold water delivered through the larger meter may be correspondingly reduced by providing the appropriate slots in the record card.

Residual liquid left in the meter 2 and manifold 35 may escape through the meter to the washing drum due to backflow of air through the meter and manifold from the delivery pipe to the washing drum and this may cause slight inaccuracies in measurement of liquid to occur for the meter 2 may conceivably measure a small quantity of air during the next solution delivery operation. In order to prevent this escape a relay operated valve 89 is inserted in the delivery pipe to the washing drum immediately adjacent the outlet from the meter and this valve which may conveniently be termed the meter valve is, in the embodiment shown in Figure 1, controlled by the control device to open and close at the appropriate times. Thus, the valve 89 is adapted to be opened by fluid under pressure supplied through conduit 90 from header 42 under control of a magnetic control valve 91 one side of the solenoid of which is connected to finger terminal 22 by wire 92 while the other side of the solenoid is connected to the common wire 57.

Normally, a small quantity of water will remain in the manifold 35 and the smaller meter 2 and will be prevented from escaping from the meter by the closed valve 89 immediately adjacent the meter outlet. Assuming hot water is to be delivered followed by delivery of a predetermined quantity of soap solution the following operations take place: The electric motor 3 is started and drives the rotary control device comprising the disc 5 and the record card 6 at a predetermined time rate until a slot in the record card 6 registers with the finger terminal 17 controlling the operation of the hot water supply valve 25 whereupon the circuit controlling the hot water supply valve is established as follows: Supply mains A; wire 10; switch plate 9; wire 8; contact plate 5; finger terminal 17; wire 82; the coil of magnetic control valve 43; common wire 57 back to the supply mains A. The magnetic control valve 43 will thus be operated to supply fluid under pressure from header 41 through conduit 45 to open the hot water supply valve 25.

Simultaneously, the motor relay switch 72 will be opened to interrupt the motor circuit by the opening of one of the relay switches 77, the circuit for effecting the opening of the latter being as follows: Supply mains A; wire 57; common lead 78; the coil 77a of the appropriate relay switch 77; lead 83; wire 82; finger terminal 17; contact plate 5; wire 8; switch plate 9 and lead 10 to supply mains A. The hot water delivered through the open valve 25 flows through pipe 27 and actuates the larger meter 1 which, through the reduction gearing and free wheel clutch referred to, drives the rotary control device at a rate corresponding with the rate of delivery of water through the meter 1. The delivery of the hot water continues until the finger terminal 17 reaches the end of the slot in the record card, which slot is of a predetermined length corresponding with a quantity of water slightly less than that desired for the washing step. The circuit controlling the magnetic control valve 43 is now disestablished and this magnetic control valve moves to a position to cut off supply of fluid under pressure to valve 25 and exhaust the conduit 45, thus valve 25 is closed and delivery through the larger meter is terminated and hence the drive of the control device by the meter is terminated. Simultaneously, the motor circuit is again established by closure of relay switch 72 due to the breaking of the circuit to the coil 77a of relay switch 77 and the motor 3 again takes over the drive of the control device, driving it at a predetermined time rate until slots in the record card 6 register respectively with the finger terminal 14 which is adapted to control the operation of the soap supply valve 32 and the finger terminal 22 adapted to control the operation of the valve 89 in the delivery pipe adjacent the outlet of the meter 2. Three operations now occur simultaneously, namely, the soap supply valve 32 is opened, the meter valve 89 is opened and the motor circuit is again interrupted. The circuit for effecting the opening of the soap supply valve 32 is as follows: Supply mains A; wire 10; switch plate 9; wire 8; contact plate 5; finger terminal 14; wire 59; the coil of magnetic control valve 48; common wire 57 back to supply mains A. The coil of magnetic control valve 48 is thus energised and the valve 48 is moved to connect the conduit 51 with the header 41 to supply fluid under pressure to open the soap supply valve 32. The circuit which is established to effect opening of the valve 89 is as follows: Supply mains A; wire 10; switch plate 9; wire 8; contact plate 5; finger terminal 22; wire 92; the coil of magnetic control valve 91; common wire 57 back to the supply mains A. Thus, the coil of magnetic control valve 91 is energised to move the valve 91 and connect the conduit 90 with the header 42 so that fluid under pressure is supplied to effect opening of valve 89. The motor circuit is interrupted by the opening of relay switch 72 due to de-energisation of the switch coil 74 brought about by the opening of one of the relay switches 77 whose coil 77a has been energised by the establishment of the following circuit: Supply mains A; wire 57; common lead 78; the coil 77a of the appropriate relay switch 77; lead 80; wire 59; finger terminal 14; contact plate 5; wire 8; switch plate 9; and lead 10 to the supply mains A. As a result of the opening of the soap supply valve 32 and the valve 89, the residual water left in the manifold 35 and smaller meter 2 is first delivered through this meter followed by delivery therethrough of the soap solution, the liquid actuating the meter 2 which takes over the drive of the control device and drives it at a rate corresponding with the rate of flow therethrough. The delivery of soap solution is terminated by closure of the soap supply valve 32 upon the finger terminal 14 reaching the end of the slot in the record card and so breaking the circuit to the coil of the magnetic control valve 48 and a small quantity of residual soap solution remains in the meter and manifold. However, simultaneously with, or immediately after, the closure of the soap supply valve 32 the flush water supply valve 85 is opened under control of the control device, by the energisation of the coil of the magnetic control valve 87 due to the finger terminal 20 registering with a slot in the record card 6 to establish a circuit as follows: Supply mains A; lead 10; switch plate 9; wire 8; contact plate 5; finger terminal 20; wire 88, the coil of magnetic control valve 87; common wire 57 back to supply mains A. Thus flushing water is delivered through the manifold 35 and smaller meter 2 and causes the residual soap solution to be delivered to the washing drum. The flush water supply valve 85 is now closed under control of the control device by the finger terminal 20 being moved out of contact with the plate 5 and so breaking the circuit of the coil of the magnetic control valve 87, leaving residual water in the meter 2 and manifold 35. Simultaneously therewith the valve 89 in the delivery pipe adjacent the outlet from the smaller meter is closed due to the circuit of the coil of the magnetic control valve 91 being broken by the finger terminal 22 moving out of contact with the plate 1, and the circuit of the motor is re-established by closure of relay switch 72 so that the motor 3 takes over the drive of the control device.

The residual water delivered prior to the delivery of a solution and that delivered during flushing of the meter makes up the desired quantity for the washing step.

A series of normally open, manually operable switches 93 are mounted on the switch plate 9, and arranged one across each of the circuits controlled by the rotary control device whereby any of the operations normally controlled by the rotary control device may be effected at any time by simply closing the appropriate switch or switches 93.

Instead of the valve 89 in the delivery pipe adjacent the meter 2 being directly controlled by the rotary control device this meter valve may be operated upon the establishment by the control device of any of the circuits controlling the solution supply valves or the flush water valve. Such a modified control of the meter valve is illustrated in Figure 2 in which parts corresponding with those of Figure 1 are given the same reference numerals.

Referring to Figure 2, four two-way, solenoid operated relay switches 94, 95, 96 and 97 are provided, one or other of which is adapted to be operated to effect breaking of the motor circuit and opening of the meter valve 89 when any of the circuits controlling the solution valves 32, 33 and 34 or the flush water valve 85 is established under control of the control device. Each two-way relay has one normally open contact and one normally closed contact, the normally closed contacts of the four two-way switches being in the lead 76 from the coil 74 of the motor relay switch 72 to the wire 8 and also included in this lead are normally closed one-way relay switches 98 and 99. The normally open contacts of the two-way switches 94 to 97, are arranged in a lead 100 from one side of supply mains A to one side of the coil of the magnetic control valve 91 which is adapted to control the supply of fluid under pressure for operating the meter valve 89. One side of each of the operating coils 101 of the relay switches 94 to 99 is connected by a common lead 102 to the wire 57 leading to one side of the supply mains A while the other sides of these coils are respectively connected by wires 103 to 108 to the wires 58, 59, 60, 88, 61 and 62 which are connected respectively with the finger terminals 13, 14, 15, 20, 16 and 17 of the control device.

The operation of the modified form of the invention is the same as that described with reference to Figure 1 except for the control of the meter valve 89. Assuming, for example, that soap solution is to be delivered the operation of the modified control is as follows: Upon the finger terminal 14, which is adapted to control the operation of the soap supply valve 32, registering with a slot in the record card 6, the soap supply valve is opened by the establishment of the circuit described with reference to Figure 1 which causes energisation of the coil of the magnetic control valve 48. Simultaneously therewith a circuit is established through the coil of the two-way relay switch 95 as follows: Supply mains A, wire 57, common lead 102, coil 101 of two-way relay switch 95, wire 104, wire 59, finger terminal 14, contact plate 5, wire 8, switch plate 9 and lead 10 to supply mains A. Thus, the coil 101 of two-way relay switch 95 is energised and the switch is thereby operated to close the normally open contacts and open the normally closed contacts of the latter. Opening of the normally closed contacts breaks the circuit of the coil 74 of the motor relay switch 72 which switch is thus opened and the circuit of the motor 3 is interrupted. The closure of the normally open contacts establishes the following circuit: Supply mains A, lead 100 including the closed contacts of relay switch 95 which are normally open, the coil of magnetic control valve 91 and common wire 57 back to the supply mains A. The coil of magnetic control valve 91 is thereby energised and this valve is moved to connect the conduit 90 with the fluid pressure header 42 so that the meter valve 89 is opened. As a result, the residual water left in the manifold 35 and meter 2 is first delivered through the meter followed by delivery therethrough of the soap solution, the liquid actuating the meter which takes over the drive of the control device and drives it at a rate corresponding with the rate of flow through the meter until the finger terminal 14 reaches the end of the slot in the record card and is moved out of contact with the plate 1 and thus effects closure of the soap supply valve 32. Simultaneously with, or immediately after, the closure of the soap supply valve, the flush water supply valve 85 is opened as previously described by the establishment of a circuit through finger terminal 20 and the coil of magnetic control valve 87 such circuit also effecting energisation of the operating coil of the two-way relay switch 97 whereby the meter valve 89 is maintained open, or is again opened if it had been allowed to close. Subsequently, the flush water valve 85 and the meter valve 89 are closed and the motor 3 again takes over the drive of the control device.

I claim:

1. In an automatic control for washing machines or the like, a plurality of supply pipes for various liquids, a supply valve in each of said supply pipes, a common pipe to which said supply pipes are connected, a measuring device to which said common pipe delivers and operable by the flow of liquid therethrough, a rotary timing device for controlling the opening of said supply valves, a motor for driving said timing device at a predetermined time rate, driving means between said measuring device and said rotary timing device, means for rendering said driving motor inoperative when a liquid delivery operation has been initiated so that the measuring device drives the timing device at a rate corresponding with the rate of delivery of liquid, and means controlled by said timing device for delivering through the common pipe and the measuring device a quantity of flushing water after each liquid delivery operation.

2. In an automatic control for washing machines or the like, a plurality of supply pipes for various liquids, a supply valve in each of said supply pipes, a common pipe to which said supply pipes are connected, a measuring device in said common pipe and operable by the flow of liquid therethrough, a rotary timing device for controlling the opening and closing of said supply valves, to effect delivery of liquid through said common pipe and said measuring device, a motor for driving said rotary timing device at a predetermined time rate, driving means between said measuring device and the rotary timing device, means for rendering the said motor inoperative when a liquid delivery operation has been initiated so that the measuring device drives the timing device at a rate corresponding with the rate of flow of the liquid being delivered, a water supply pipe connected with said common pipe, a water supply valve in said water supply pipe, and means under control of the rotary timing device for opening said water supply valve after each liquid delivery operation to deliver a quantity of flushing water through said common pipe and said measuring device.

3. In an automatic control for washing machines or the like, a plurality of supply pipes for various liquids, a supply valve in each of said supply pipes, a common pipe to which said supply pipes deliver, a measuring device to which said common pipe is connected and operable by the flow of liquid therethrough, a rotary electric switch, electric circuits controlled by said rotary electric switch for opening and closing said supply to effect delivery of liquid through said common pipe and said measuring device, a motor for driving said rotary electric switch at a predetermined time rate, driving means between the measuring device and the rotary electric switch, means for rendering the motor inoperative whenever a circuit for opening a supply valve has been completed by said rotary electric switch so that the measuring device is effective to drive the rotary switch at a rate corresponding with the rate of delivery of the liquid through the measuring device, and means controlled by said rotary electric switch for effecting delivery of a quantity of flushing water through said common pipe and said measuring device after each liquid delivery operation.

4. In an automatic control for washing machines or the like the combination comprising a plurality of supply pipes for various liquids, a supply valve in each of said supply pipes, a common pipe to which all of said supply pipes deliver, a measuring device to which said common pipe leads and operable by the flow of liquid therethrough, a delivery pipe leading from said measuring device, a rotary timing device for controlling the opening of said supply valves to effect delivery of liquid through the common pipe and the measuring device, a motor for driving said timing device at a predetermined time rate, driving means between said measuring device and said rotary timing device, means for rendering said motor inoperative when a liquid delivery operation has been initiated so that the measuring device takes over the drive of the rotary timing device to drive it at a rate corresponding with the rate of delivery of liquid, means under control of the timing device for delivering a quantity of flushing water through the common pipe and the measuring device after each liquid delivery operation, a valve in the said delivery pipe adjacent the outlet from the measuring device, and means for opening said delivery pipe valve whenever a liquid supply valve is opened or flushing water is delivered through said common pipe and measuring device.

5. In an automatic control for washing machines or the like a plurality of supply pipes for various liquids, a supply valve in each of said supply pipes, a common pipe to which said supply pipes are connected, a measuring device to which said common pipe delivers, a delivery pipe leading from said measuring device, a valve in said delivery pipe adjacent the outlet from the measuring device, a rotary timing device for controlling the opening of said supply valves to effect delivery of liquid through the common pipe and the measuring device to operate the latter, a motor for driving said rotary timing device at a predetermined time rate, driving means between the measuring device and the rotary timing device, means controlled by said timing device for opening said valve in the delivery pipe when a liquid delivery operation is initiated, and means for rendering the said motor inoperative whenever a liquid supply valve is opened to permit the measuring device to take over the drive of the rotary timing device and drive it at a rate corresponding with the rate of delivery of liquid.

6. In an automatic control for washing machines or the like, the combination comprising, a plurality of supply pipes for supplying various liquids, a supply valve in each of said supply pipes, a common pipe to which said supply pipes are commonly connected, a measuring device to which said common pipe leads, a delivery pipe leading from said measuring device, a rotary electric switch, circuits controlled by said rotary electric switch for opening and closing said supply valves for effecting delivery of liquid through said common pipe and said measuring device, a motor for driving the rotary electric switch at a predetermined time rate, driving means between the said measuring device and said rotary electric switch, means for rendering said motor inoperative when a supply valve is opened so that the measuring device takes over the drive of the rotary electric switch to drive it at a rate corresponding with the rate of delivery of liquid, means controlled by said rotary electric switch for effecting delivery of a quantity of flushing water through said common pipe and said measuring device after each liquid delivery operation, a valve in said delivery pipe adjacent the outlet from said measuring device, and means for opening said last-mentioned valve upon initiation of delivery of liquid or flushing water through the common pipe and measuring device.

7. In an automatic control for washing machines or the like, a plurality of liquid supply pipes for supplying various liquids, a supply valve in each of said supply pipes, a common pipe to which each of said supply pipes deliver, a measuring device to which said common pipe delivers, a delivery pipe leading from said measuring device, a valve in said delivery pipe immediately adjacent the outlet from the measuring device, a rotary electric switch, circuits controlled by said rotary electric switch for opening said supply valves to effect delivery of liquid through said common pipe and said measuring device, a motor for driving the rotary electric switch at a predetermined time rate, driving means between said measuring device and said rotary electric switch, a circuit controlled by said rotary electric switch for opening the valve in said delivery pipe simultaneously with the closure of one of said circuits controlling the opening of a supply valve, and means for rendering said driving motor inoperative whenever a liquid supply valve is opened to permit the measuring device to take over the drive of the rotary electric switch and drive it at a rate corresponding with the rate of delivery of liquid.

8. In an automatic control for washing machines or the like, a plurality of supply pipes for various liquids, a supply valve in each of said supply pipes, a common pipe to which each of said supply pipes is connected, a measuring device to which said common pipe leads, a delivery pipe leading from said measuring device, a valve in said delivery pipe immediately adjacent the outlet from said measuring device, a rotary electric switch, circuits controlled by said rotary electric switch for opening said supply valves to effect delivery of liquid through said common pipe and said measuring device, a motor for driving said rotary electric switch at a predetermined time rate, driving means between the said measuring device and the rotary electric switch, means for rendering the motor inoperative whenever a liquid supply valve is opened so as to permit the measuring device to take over the drive of the rotary electric switch and drive it at a rate corresponding with the rate of delivery of liquid, an electric circuit for opening said delivery pipe valve, said last-mentioned circuit including normally open solenoid operated switches the solenoids of which are arranged one in each of said circuits controlling the opening of said supply valves whereby when a supply valve circuit is completed one of said solenoid operated switches is closed to effect closure of the circuit for opening the delivery pipe valve.

9. In an automatic control for washing machines or the like, a plurality of supply pipes for various liquids, a supply pipe for water, a supply valve in each of said liquid and water supply pipes, a manifold to which each of said supply pipes leads, a flow meter operable by the flow of liquid therethrough, a common pipe connecting said manifold and said flow meter, a delivery pipe from said flow meter, a valve in said delivery pipe adjacent the meter outlet, a timing device for opening said liquid and water supply valves and said valve in the meter delivery pipe at predetermined times, a motor for driving the timing device at a predetermined time rate, driving means between the flow meter and the timing device, and means for rendering the said motor inoperative whenever the timing device effects the opening of one of said liquid or water supply valves so that the flow meter takes over the drive of the timing device to drive it at a rate corresponding with the rate of flow of liquid through the flow meter.

ALLAN PEILE BROCKBANK.